United States Patent [19]

Ishitani et al.

[11] Patent Number: 4,482,158
[45] Date of Patent: Nov. 13, 1984

[54] STERN TUBE SEAL DEVICE

[75] Inventors: Kenichiro Ishitani, Tokyo; Toshiharu Hamasaki, Nagasaki; Shoji Shiomi; Eiichi Kawamura, both of Saitama, all of Japan

[73] Assignees: Mitsubishi Jukogyo Kabushiki Kaisha; Eagle Industry Co., Ltd., both of Tokyo, Japan

[21] Appl. No.: 593,329

[22] Filed: Mar. 26, 1984

[30] Foreign Application Priority Data

Apr. 21, 1983 [JP] Japan ................................. 58-58717

[51] Int. Cl.³ ........................ F16J 15/38; F16J 15/40
[52] U.S. Cl. ........................................ 277/3; 277/27; 277/59; 277/81 S; 277/192
[58] Field of Search .................. 277/3, 27, 59, 65, 71, 277/72 R, 72 FM, 79, 81 R, 81 S, 93 R, 93 SD, 192

[56] References Cited

U.S. PATENT DOCUMENTS

| | | | |
|---|---|---|---|
| 3,088,744 | 5/1963 | Ezekiel et al. | 277/3 |
| 3,565,447 | 2/1971 | Goetze et al. | 277/59 |
| 3,625,523 | 12/1971 | Gardner et al. | 277/59 |
| 3,726,531 | 4/1973 | Pagan et al. | 277/59 |
| 3,894,741 | 7/1975 | McHugh | 277/27 |
| 4,085,941 | 4/1978 | Wilkinson et al. | 277/3 |
| 4,094,512 | 6/1978 | Back | 277/27 |
| 4,145,059 | 3/1979 | Imai et al. | 277/81 R |
| 4,183,540 | 1/1980 | Hytonen | 277/27 |

FOREIGN PATENT DOCUMENTS 939860 6/1982 U.S.S.R. ................................. 277/3

*Primary Examiner*—Robert S. Ward
*Attorney, Agent, or Firm*—Jordan and Hamburg

[57] ABSTRACT

A stern tube seal device wherein an annular case member is arranged in the outer periphery of a shaft, a gap between both the members is sealed in multiple stage by using a plurality of seal members such as a segment seal member, a lip seal member and the like, and pressure gas is fed at the rear of the segment seal member which forms one of these seal members to enhance a seal effect by pressure of the gas.

1 Claim, 2 Drawing Figures

STERN TUBE SEAL DEVICE

BACKGROUND OF THE INVENTION

The present invention relates to a stern tube seal device.

One of prior art seal devices of this kind heretofore known has been designed so that a plurality of lip seals in close contact with and slidable relative to the shaft are arranged so as to prevent both leakings, one being leaking of sea water into a machine (into a ship) and the other being leaking of lubricating oil (bearing oil) outside the ship. However, in these prior arts, the seal relies upon the sliding portion formed by the shaft, the lip seal member or the like. If operation is carried out for a long period of time, the lip seal member tends to be worn or deformed to deteriorate the performance of the seal.

SUMMARY OF THE INVENTION

In view of the problems noted above, it is an object of the present invention to provide a stern tube seal device which is excellent in sealing performance for both sea water and lubricating oil and can enhance a long-period durability.

To achieve the above-described object, a stern tube seal device in accordance with the present invention is designed so that an annular recess portion is provided in the inner peripheral surface of a hole of a plurality of case members disposed in the outer periphery of a shaft, a segment seal member is arranged within the annular recess portion, a feeding mechanism is provided to feed pressure gas to the annular recess portion closed by the segment seal member, a lip seal member is arranged at the sea water side of the segment member, and a mechanical seal, packings or other float seal member and arranged at the lubricating oil side.

While the present invention has been briefly described, the present invention and other objects and novel features thereof will become completely apparent from reading of the following detailed description in connection with embodiments shown in the accompanying drawings. However, the drawings show the embodiments merely for the purpose of understanding the present invention and the scope of the present invention is not limited thereby.

DESCRIPTION OF PREFERRED EMBODIMENTS

Figure 1:
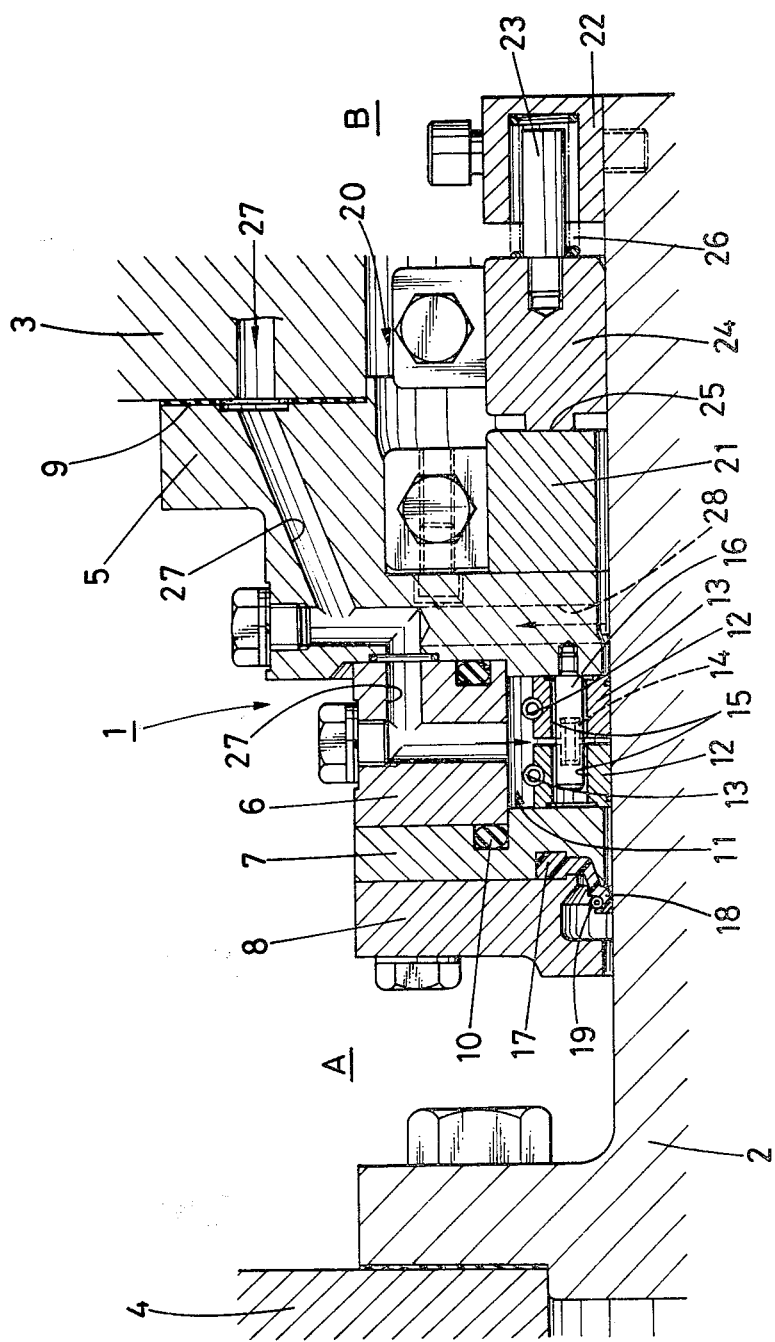
FIG. 1 is a sectional view cut in half of a stern tube seal device in accordance with a first embodiment.

First, a stern tube seal device in accordance with a first embodiment of the present invention will now be described with reference to FIG. 1.

The stern tube seal device generally indicated at 1 seals between a shaft or a sleeve 2 fitted externally of the shaft and a ship body 3 in which the shaft is inserted. A reference numeral 4 designates a part of a propeller mounted on the extreme end of the shaft.

A reference numeral 5 designates a first case member (casing) fixed to the ship body 3 through a gasket 9, and a second case member (an intermediate ring 6), a third case member (an adapter ring 7) and a fourth case member (an aft cover 8) are airtightly mounted in said order from the first case member 5 towards sea water A by use of packings 10 or the like. In these case members 5, 6, 7 and 8 which are annular in shape, only the second case member 6 has a large diameter hole, said second case member 6 having an annular recess portion 11 formed in the inner periphery thereof, said annular recess portion 11 having a pair of segment seal members 12 and 12 disposed therein. The segment seal members 12 and 12 are brought into close contact with the outer peripheral surface of the sleeve 2 by fastening forces of garter sprigs 13 and 13, the segment seal member 12 at the left side in the figure being brought into close contact with the end of the third case member 7 by the stretching force of a coiled spring 14 resiliently mounted on the opposed surface between both the members 12 and 12 whereas the segment seal member 12 at the right side being brought into close contact with the end of the first case member 5. A pin 16 fixed to the first case member 5 is fitted into holes 15 and 15 coaxially bored in both the members 12 and 12 to stop rotation of the segment seal members 12 and 12 with respect to the case member 5.

A reference numeral 17 designates a lip seal member held and secured between the third and fourth case members 7 and 8, and an annular lip 18 having a garter spring 19 fastened thereto is brought into close contact with the outer peripheral surface of the sleeve 2 against sea water A. A reference numeral 20 designates a mechanical seal disposed at the side of lubricating oil B of the segment seal members 12 and 12, which mechanical seal comprises a slidable ring 21 at the fixed side fitted in the inner periphery of a shoulder of the first case member 5 and a slidable ring 24 at the rotational side stopped by a pin 23 with respect to a cover ring 22 fixed to the sleeve 2 and driven as the shaft rotates to form a seal sliding surface 25 in a contact surface between both the slidable rings 21 and 24. The slidable ring 24 at the rotational side is resiliently biased towards the slidable ring 21 at the fixed side by means of a coiled spring 26. A reference numeral 27 designates a pressure gas feeding mechanism in communication with the interior of the annular recess portion 11 closed by the segment seal members 12 and 12 from the side of the ship body 3, wherein a pipe line is disposed which extends through the first and second case members 5 and 6 from the ship body 3, and pressure gas is fed into the annular recess portion 11 by a feeding device (not shown) disposed therein. A reference numeral 28 designates a leaked liquid recovery mechanism formed separately from the pressure gas feeding mechanism 27, wherein a pipe line open to a space between the segment seal member 12 and the mechanical seal 20 is arranged to recover the leaked liquid entered the space into the ship.

As described above, the stern tube seal device 1 constructed as described above is to prevent leaking of sea water A into the ship and leaking of lubricating oil B outside the ship. In general, the pressure gas feeding mechanism 27 and leaked liquid recovery mechanism 28 are placed in operation during sealing. On the other hand, the lip seal member 17 and segment seal member 12 serve to prevent sea water A from leaking-in, and particularly, the segment seal member 12 is pushed by pressure gas fed into the annular recess portion 11 at the rear thereof and strongly pressed against the sleeve 2 and case member 7 to enhance the seal effect of the seal portion. In addition, when pressure of the pressure gas is increased, the pressure gas passes through the seal portion and is conversely present in the space between the lip seal member 17 and segment seal member 12 or balanced with sea water pressure in said space to display the seal effect. Furthermore, when the space is filled with pressure gas, back pressure is applied to the lip seal member 17 to place the lip seal member 17 in an idling state (the force in close contact with the sleeve 2 disappears) to prevent early wear, deformation or the like of the member 17. In this case, the lip seal member 17 acts as a dust seal which prevents entry of foreign matter into the ship, but when pressure of pressure gas decreases, the lip seal member 17 is pressed by sea water pressure into close contact with the sleeve 2 to automatically act as a first sea water resisting seal. Next, for the other lubricating oil B, the mechanical seal 20 acts as a first seal portion to prevent it from leaking-out, and even if the lubricating oil B should leak through the seal portion, leaking of the oil outside the ship could be completely cut off by the segment seal 12. If the lubricating oil B enters the space between the mechanical seal 20 and the segment seal portion 12, the oil passes through the seal portion of the segment seal member 12 and is recovered together with pressure gas invaded into the space into the ship by the leaked oil recovery mechanism 28, for reuse. The stern tube seal device contructed as described above can completely seal both sea water A and lubricating oil B in a manner as described above.

Figure 2:
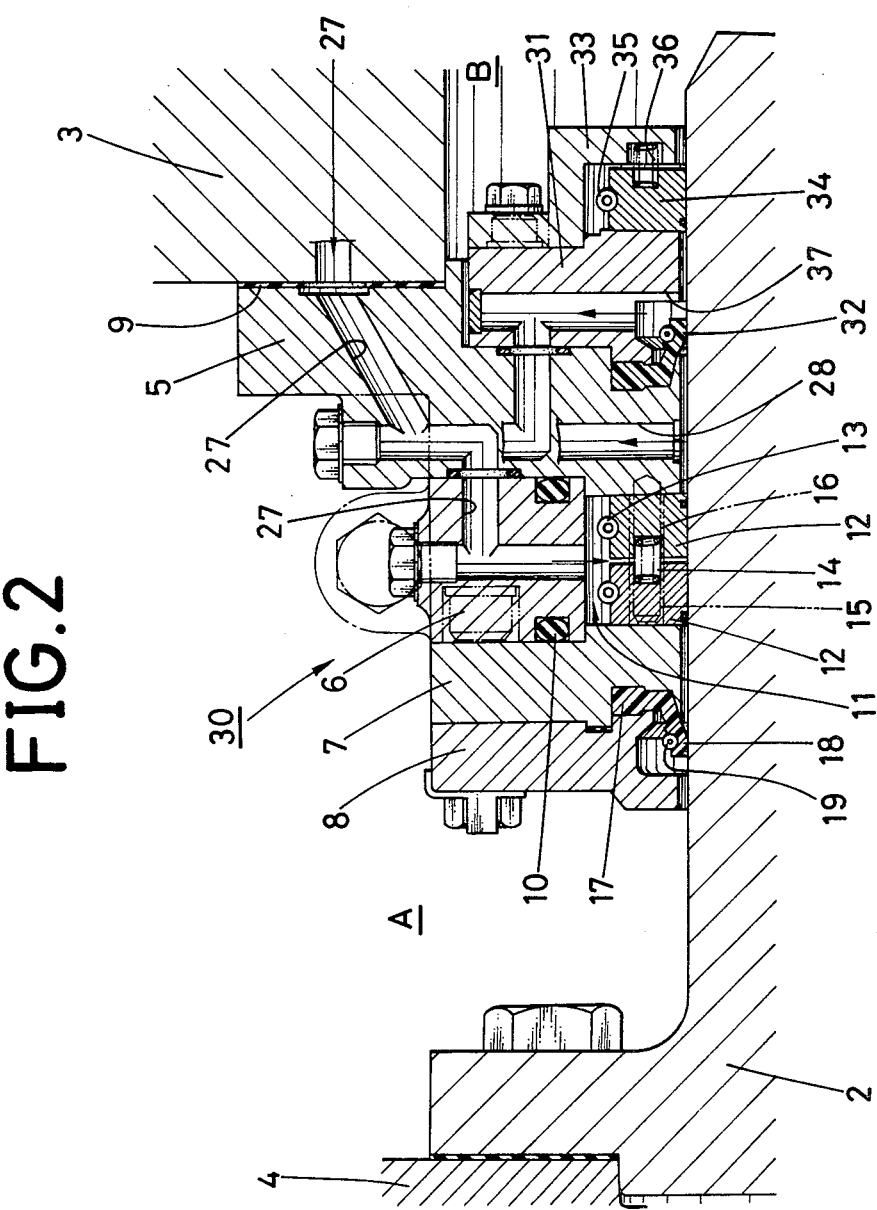
FIG. 2 is a sectional view cut in half of a stern tube seal device in accordance with a second embodiment.

Next, a second embodiment of the present invention will be described with reference to FIG. 2. In FIG. 2, the same reference numerals as those used in the abovedescribed first embodiment (FIG. 1) designate the same members. That is, a reference numeral 2 designates a sleeve, 3 a ship body, 4 a propeller, 5, 6, 7 and 8 case members, 11 an annular recess portion, 12 and 12 segment seal members, 17 a lip seal member, 27 a pressure gas feeding mechanism, and 28 a leaked oil recovery mechanism.

A stern tube seal device 30 having these members in principally different from the device shown in the abovedescribed first embodiment in the following. That is, a fifth case member 31 is fitted in the inner periphery of a shoulder of the first case member 5, and a second lip seal member 32 is held and secured between both the members 5 and 31. A sixth case member 33 is further fitted at the side of lubricating oil B of the fifth case member 31, and a third segment seal member 34 is mounted as a float seal member in a space between both the members 31 and 33. The segment seal member 34 is brought into close contact with the outer peripheral surface of the sleeve 2 by a garter spring 35 fitted in the outer periphery of the segment seal member and brought into close contact with the end of the fifth case member 31 by a coiled spring 36 to be stopped by a pin not shown with respect to the sixth case member 33. A pipe line of a second leaked liquid recovery mechanism 37, which is open to a space between the lip seal member 32 and segment seal member 34, is provided extending from the fifth case member 31 to the first case member 5. The first and second leaked liquid recovery mechanisms 28 and 37 can provide the junction of pipe lines within the first case member 5 or ship body 3 to use in common of an intake recovery device such as a pump.

The stern tube seal device 30 constructed as described above displays similar operation and effect in sea water A resisting seal to those of the abovedescribed first embodiment. As for lubricating oil B, the first seal portion is formed by the third segment seal member 34 to assume the extremely reduced state even if lubricating oil leaking through the seal portion is present, and therefore, sufficient sealing can be achieved by the lip seal member 32 without much difficulty to recover it into the ship by the leaked liquid recovery mechanism 37.

In the stern tube seal device of the present invention, generally, a segment seal member, a lip seal member, a mechanical seal and the like constitute a multiple stage seal portion, and pressure of pressure gas is utilized, as described above. Therefore, not only the excellent sealing performance with respect to both sea water and lubricating oil is displayed but also the lip seal member or the like can be relieved in burden by the pressure of pressure gas to enhance the long-period durability of the whole device.

While the preferred embodiments of the present invention have been described, it will be apparent that the present invention can be variously modified without departing the principle thereof. It is therefore desired that all the modifications, by which the effects of the present invention are obtained substantially through the use of substantially identical or corresponding structures, are included in the category of the present invention by the appended claim.

What is claimed is:

1. A stern tube seal device characterized in that a plurality of annular case members are arranged in the outer periphery of a shaft, an annular recess portion is provided in the inner peripheral surface of a hole of said case members, a segment seal member is arranged within said annular recess portion, a feeding mechanism is provided to feed pressure gas to said annular recess portion closed by said segment seal member, a lip seal member is arranged at the sea water side of said segment seal member, and a mechanical seal, packings or other float seal member are arranged at the lubricating oil side thereof.

* * * * *

UNITED STATES PATENT AND TRADEMARK OFFICE
CERTIFICATE OF CORRECTION

PATENT NO. : 4,482,158

DATED : November 13, 1984

INVENTOR(S) : Kenichiro ISHITANI et al.

It is certified that error appears in the above-identified patent and that said Letters Patent is hereby corrected as shown below:

The title page should be deleted to appear as per the attached title page.

Signed and Sealed this

Sixteenth Day of April 1985

[SEAL]

*Attest:*

DONALD J. QUIGG

*Attesting Officer*   *Acting Commissioner of Patents and Trademarks*

United States Patent [19]

Ishitani et al.

[11] Patent Number: 4,482,158

[45] Date of Patent: Nov. 13, 1984

[54] STERN TUBE SEAL DEVICE

[75] Inventors: Kenichiro Ishitani, Tokyo; Toshiharu Hamasaki, Nagasaki; Shoji Shiomi; Eiichi Kawamura, both of Saitama, all of Japan

[73] Assignees: Mitsubishi Jukogyo Kabushiki Kaisha; Eagle Industry Co., Ltd., both of Tokyo, Japan

[21] Appl. No.: 593,329

[22] Filed: Mar. 26, 1984

[30] Foreign Application Priority Data

Apr. 21, 1983 [JP] Japan ................... 58-58717

[51] Int. Cl.³ .................. F16J 15/38; F16J 15/40
[52] U.S. Cl. .......................... 277/3; 277/27; 277/59; 277/81 S; 277/192
[58] Field of Search ............. 277/3, 27, 59, 65, 71, 277/72 R, 72 FM, 79, 81 R, 81 S, 93 R, 93 SD, 192

[56] References Cited

U.S. PATENT DOCUMENTS

| 3,088,744 | 5/1963 | Ezekiel et al. | 277/3 |
| 3,565,447 | 2/1971 | Goetze et al. | 277/59 |
| 3,625,523 | 12/1971 | Gardner et al. | 277/59 |
| 3,726,531 | 4/1973 | Pagan et al. | 277/59 |
| 3,894,741 | 7/1975 | McHugh | 277/27 |
| 4,085,941 | 4/1978 | Wilkinson et al. | 277/3 |
| 4,094,512 | 6/1978 | Back | 277/27 |
| 4,145,059 | 3/1979 | Imai et al. | 277/81 R |
| 4,183,540 | 1/1980 | Hytonen | 277/27 |

FOREIGN PATENT DOCUMENTS 939860 6/1982 U.S.S.R. ................... 277/3

Primary Examiner—Robert S. Ward
Attorney, Agent, or Firm—Jordan and Hamburg

[57] ABSTRACT

A stern tube seal device wherein an annular case member is arranged in the outer periphery of a shaft, a gap between both the members is sealed in multiple stage by using a plurality of seal members such as a segment seal member, a lip seal member and the like, and pressure gas is fed at the rear of the segment seal member which forms one of these seal members to enhance a seal effect by pressure of the gas.

1 Claim, 2 Drawing Figures